United States Patent
Skog et al.

(10) Patent No.: US 7,284,160 B2
(45) Date of Patent: Oct. 16, 2007

(54) ERROR MESSAGING METHOD IN HTTP BASED COMMUNICATION SYSTEMS

(75) Inventors: Robert Skog, Hässelby (SE); Staffan Pehrson, Danderyd (SE); Imre Boda, Kaposvár (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/538,237

(22) PCT Filed: Dec. 13, 2002

(86) PCT No.: PCT/SE02/02332

§ 371 (c)(1),
(2), (4) Date: Dec. 19, 2005

(87) PCT Pub. No.: WO2004/084524

PCT Pub. Date: Sep. 30, 2004

(65) Prior Publication Data

US 2006/0236187 A1    Oct. 19, 2006

(51) Int. Cl.
*G06F 11/00* (2006.01)
(52) U.S. Cl. ...................................................... 714/43
(58) Field of Classification Search .................... 714/43
See application file for complete search history.

(56) References Cited

U.S. PATENT DOCUMENTS

| | | | |
|---|---|---|---|
| 6,134,680 A | 10/2000 | Yeomans | |
| 6,353,855 B1 | 3/2002 | Hendren, III | |
| 6,778,651 B1* | 8/2004 | Jost et al. ............... | 379/201.01 |
| 7,009,528 B2* | 3/2006 | Griep ..................... | 340/825.72 |
| 7,062,547 B2* | 6/2006 | Brown et al. ................ | 709/221 |
| 2002/0126708 A1 | 9/2002 | Skog et al. | |
| 2006/0031264 A1* | 2/2006 | Bosworth et al. ........... | 707/200 |

FOREIGN PATENT DOCUMENTS

| | | |
|---|---|---|
| JP | 2002-229887 A | 8/2002 |
| WO | 0157666 A2 | 9/2001 |
| WO | 02096063 A2 | 11/2002 |

OTHER PUBLICATIONS

Araki, "Java Server Pages (9) Tacit Object (2)", UNIX Magazine, 11-2000, pp. 130-131 (w/English translation thereof).
Araki, "Java Server Pages (9) Tacit Object (2)", UNIX Magazine, 11-2000, pp. 130-131 (w/English translation thereof).
International Search Report of PCT/SE02/02332 mailed Jul. 2, 2003.

* cited by examiner

*Primary Examiner*—Bryce P Bonzo
(74) *Attorney, Agent, or Firm*—Nixon & Vanderhye, P.C.

(57) ABSTRACT

The invention relates to error messaging in HTTP based communication systems. An intermediate device (20) interconnecting a wireless client terminal (10) and a web server (30) transforms error messages sent from the server before transmitting them to the client. Hereby, a first error status code from the server is transformed into an error description message comprising an error description text and second status code. The second status code preferably enforces display of the error description text at the client terminal. The invention is with advantage implemented in a proxy server (20) through an error information table (22) providing resource-location dependent error messages.

16 Claims, 5 Drawing Sheets

ERROR MESSAGING METHOD IN HTTP BASED COMMUNICATION SYSTEMS

This application is the U.S. national phase of international application PCT/SE2002/002332 filed 13 Dec. 2002, the entire content of which is hereby incorporated by reference.

TECHNICAL FIELD

The present invention relates to message handling in communication networks and in particular to error messaging for communication based on the Hypertext Transfer Protocol (HTTP).

BACKGROUND

Today, practically all web servers, clients and related web applications talk to each other through HTTP. The communication is based on HTTP requests and responses between clients and servers, for which HTTP defines a request response protocol. Every time a client sends an HTTP request, the web server returns a MIME (Multipurpose Internet Mail Extensions) header. The start line of the response reads:

<version> <status code> <reason phrase>

The version part refers to the version of HTTP used for the message. The status code is a three-digit code number roughly indicating what happened during the request. Status codes are grouped into general classes, which are described by the first digit. For example, codes on the format 2XX means "success", whereas 4XX and 5XX codes indicate "client error" and "server error", respectively. The reason phrase, finally, is a human readable version of the code number, the features of which will be described below. The standard HTTP response to a successful GET request is:

HTTP/1.0 200 OK

The above line is typically followed by further header information, such as content type and length, and then the requested document.

A commonly used prior-art communication network comprises a web server communicating with a client terminal via a proxy server (generally referred to as "proxy"). The proxy shuffles HTTP messages back and forth between the server and client. More specifically, the proxy conveys each request, which is based on HTTP or on the Wireless Session Protocol (WSP), from the wireless client to the web server and each subsequent HTTP response from the web server to the client. The start line of the response passes the proxy unchanged and the end-user receives a response message directly corresponding to the response sent from the web server.

Now assume that the server encounters an error and reports that in the HTTP response. For such a case (HEAD requests excepted) the HTTP protocol states that the server "should include an entity containing an explanation of the error situation" in the response ("Hypertext Transfer Protocol—HTTP/1.1", RFC 2616, R. Fielding et. al., June 1999). Furthermore, user agents "should display any included entity to the user". This means that there may—or may not—be an explanation entity, i.e. a reason phrase, incorporated in the response message. Furthermore, even when there is a reason phrase it is not certain that it will be presented to the end-user. Sometimes only the error code is displayed. The provider of the requested service, e.g. a mobile operator, cannot possibly know what will happen in a particular error situation.

Moreover, even if a reason phrase is shown, it may reflect the actual error situation very badly or even erroneous. The HTTP specification does not provide any guidance on the exact text for reason phrases, which are therefore rather arbitrary. Consequently, the end-user might get the wrong impression of the service provider, which is a very serious problem since it reduces the value of the service in the eyes of the user.

Accordingly, conventional handling of HTTP error messages is far from satisfactory and there is a considerable need for an improved error messaging method.

SUMMARY

A general object of the present invention is to provide improved error handling in HTTP communication systems. A more specific object is to achieve reliable and informative error messages for client-server communication through an intermediate device.

These objects are achieved in accordance with the attached claims.

Briefly, the method of the present invention utilizes the intermediate device interconnecting a wireless client terminal and a web server to achieve control of error messages sent from the server. The error status code sent from the server is transformed into an informative error description message including an extended error description text as well as a new status code. The new status code is preferably chosen such that it enforces display of the error description text. In this way, it is possible to control what message an end-user will receive in response to an unsuccessful request and also to guarantee that the message is actually displayed at the client terminal. The invention is applicable on HTTP based communication and preferably implemented in a proxy server through an error information table providing resource-location dependent error description messages.

In accordance with another aspect of the invention there is provided a proxy server with error messaging means. Error messaging means for Multimedia Messaging Service (MMS) communication is also provided.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings the same reference numbers are used for similar or corresponding elements.

Figure 1:
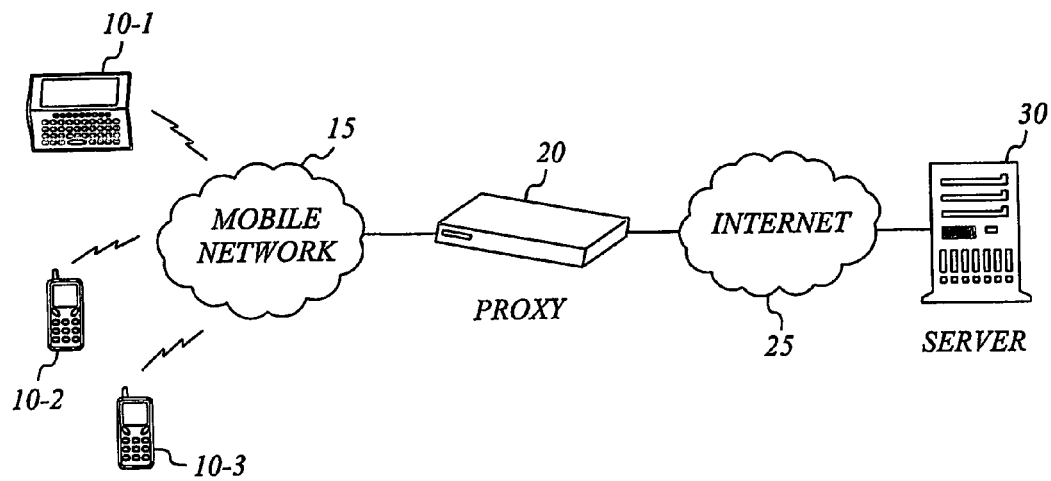
FIG. 1 is a schematic overview of an exemplary network for communication between wireless clients and a web server.

FIG. 1 is a schematic overview of an exemplary network for communication between wireless clients and a web server. A communication system comprising a number of wireless client terminals 10-1, 10-2, 10-3, such as mobile phones, pagers and laptops, on one side and a web server 30 on the other is shown. The system further includes a proxy server 20, an intermediate device that forms a bridge between the mobile network 15 and the services on the Internet 25. The proxy 20 may for instance also perform message filtering and/or provide security solutions and other services. In practice, most communication systems comprise multiple proxies and servers arranged in a more complex network than in the basic example of FIG. 1.

Figure 2:
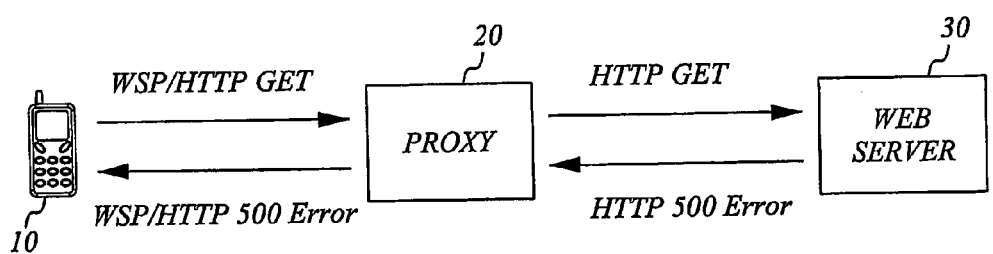
FIG. 2 is a schematic block diagram illustrating conventional error messaging upon client-server communication through an intermediate device.

As outlined in the background section, the error information that an end-user receives upon client-server communication through an intermediate device is generally inadequate. The situation is illustrated in FIG. 2, which is a schematic block diagram of conventional error messaging. A wireless client terminal 10 is via a proxy server 20 connected to a web server 30. The wireless client 10 sends a GET request to the proxy 20, which conveys the message to the web server 30. As indicated in the drawing, the client 10 and proxy 20 talk to each other through either the WSP or the HTTP protocol. WSP is at present the most common language for this type of communication. However, the communication between the proxy 20 and web server 30 is always HTTP based. The web server 30 of FIG. 2 encounters an error when processing the request and sends a response with, for example, the status code 500 for "server error" to the proxy 20, which forwards the response start line unchanged to the client terminal 10. The response may or may not contain the rather limited reason-phrase described in the background section, which may or may not be displayed at the client terminal 10.

Figure 3:
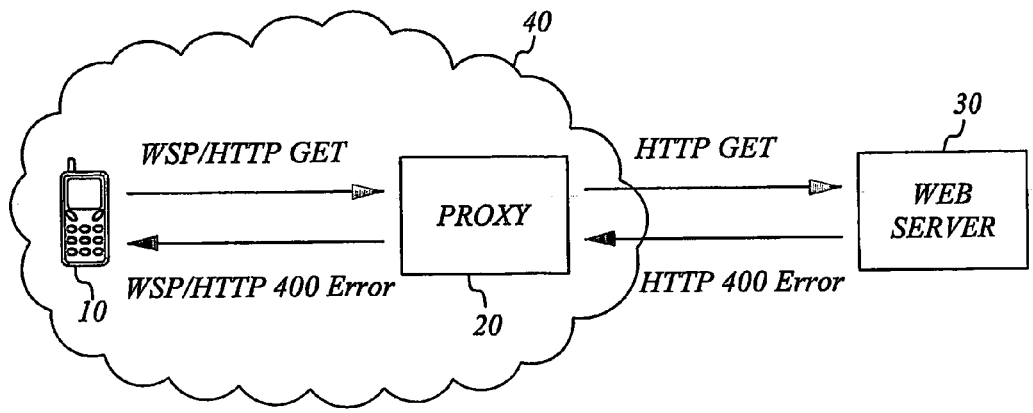
FIG. 3 is a schematic block diagram illustrating conventional error messaging for a system with an external web server.

It is evident from FIG. 2 that the end-user sees what the web server wants it to see in terms of error information. This is particularly problematic for situations like the one in FIG. 3, where an external web server is employed. The web server 30 is located outside the control range 40 of the mobile operator, e.g. on the Internet. An error message, in this example with the error status code 400, is sent from the external web server 30, passes the proxy 20, and is received at the client terminal 10. At best the end-user sees a meager reason phrase, but he may also be left with only the rather incomprehensible error status code, and it is likely that he gets the impression that the mobile operator has a poor service quality. The mobile operator cannot affect the existence and wording of a possible reason phrase.

Figure 4:
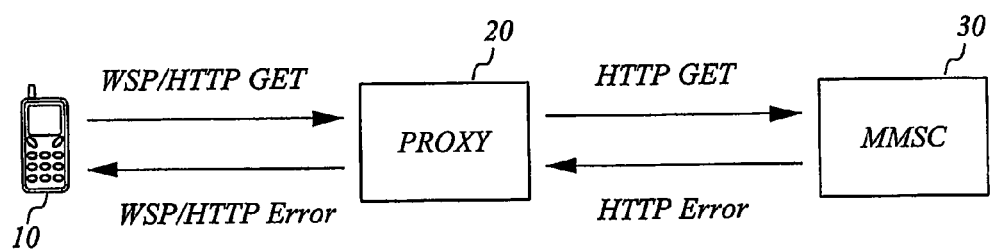
FIG. 4 is a schematic block diagram illustrating conventional error messaging for MMS communication.

Problems of the above-described type also arise in relation to services that are operated by the mobile operator, for example MMS. Such a situation is disclosed in FIG. 4, which is a schematic block diagram of conventional error messaging for MMS communication. The elements of FIG. 4 correspond directly to those of FIG. 3, except for the server 30, which in this case is a MMS center (MMSC). Assume for instance that the end-user has received MMS messages that are stored in the MMSC 30, and that the notifications thereof for some reason do not reach the end-user. His mobile phone 10 may for example be turned off. After a certain period of time the MMS messages will be erased from the MMSC 30 but when the mobile phone 10 becomes available again, the end-user still receives notifications that there exists MMS messages in the MMSC 30. As he tries to collect them, an error message will be displayed. This error message is an HTTP response with an error status code, which passes the proxy 20 unchanged like in the above-described cases. There is no way of informing the end-user that the messages have been erased. Naturally, this may lead to bad perception of the offered service, in this case MMS, and eventually to dissatisfied customers.

The present invention eliminates the above problems by taking advantage of the fact that the mobile operator generally controls the proxy in the above situations. Instead of just passing on an error status code from the web server to the client terminal, the proxy of the invention transforms the status code into an error description message including two parts that together result in a most reliable and advantageous error message handling. This will now be described in detail with reference to FIGS. 5 and 6.

Figure 5:
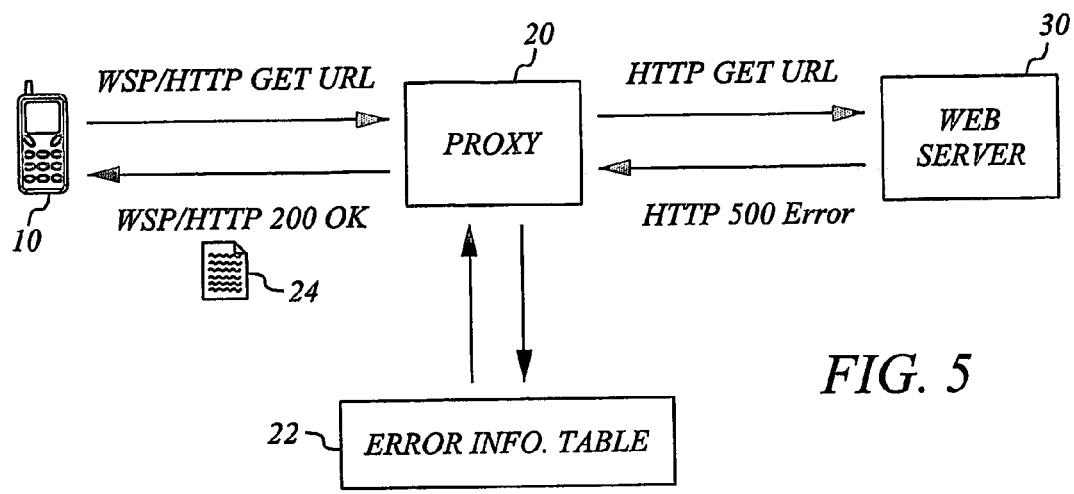
FIG. 5 is a schematic block diagram of an examplary embodiment of an error messaging system according to the present invention.

FIG. 5 is a schematic block diagram of an examplary embodiment of an error messaging system according to the invention. As before, the request and response messages between the wireless client terminal 10 and the web server 30 passes an intermediate device 20, such as a proxy server or a gateway (here illustrated as the former). The wireless client terminal 10 is in the communication system in accordance with the invention implemented as any suitable kind of wireless device, including mobile phones, laptops and personal digital assistants. The wireless client terminal 10 and the intermediate device 20 may either speak WSP or HTTP to each other, although the currently most preferred embodiment of the invention uses WSP for client-proxy communication. The intermediate device 20 of the invention may be a WSP proxy/Wireless Application Protocol (WAP) gateway or an HTTP proxy. It could for instance with advantage be the Mobile Internet Enabling Proxy 1.0 available from Ericsson. The communication between the intermediate device 20 and the web server 30 is governed by the HTTP protocol. The web server 30 thus processes HTTP requests and serves responses and is also referred to as an HTTP server. The server used with the invention may implement a wide range of functionalities and can e.g. be a MMSC.

Still referring to FIG. 5, the client terminal 10 sends a GET request asking for a resource on a location specified by the Uniform Resource Locator (URL) to the proxy 20, which forwards the HTTP message to the requested web server 30 in the conventional way. When an error is encountered the server 30 outputs a first HTTP error status code (500 in the example of FIG. 5) to the proxy 20. According to the invention, the proxy 20 then transforms this first error status code into an error description message comprising an error description text 24 and a second status code (200 in the example of FIG. 5) before the message is transmitted to the client terminal 10.

The error description text 24 is a text of arbitrary length that explains the error situation to the end-user. It is preferably implemented as a page of the Wireless Markup Language (WML) or the Hypertext Markup Language (HTML). The error description text is thus not to be confused with the optional and very limited reason phrase that, as mentioned in the background section, sometimes accompanies the error status code in the start line of an HTTP message.

The second status code serves to ensure that the error description text 24 is displayed at the client terminal 10. Preferably, an HTTP status code of the 2XX format, such as the 200 code, forms the second status code of the invention, since these codes mean "success" and thus imply that an attached document is always shown. Hence, an error description page sent together with the 200 status code is guaranteed to be presented to the end-user.

The present invention thus uses a status code which does not have to indicate an error but could instead constitute a positive response to enforce display of the desired error description text at the client terminal. In this way, the mobile operator controls both the actual description text of the error message as well as the presentation thereof and can achieve compulsory display of any desired explanation text to the end-user.

Figure 6:
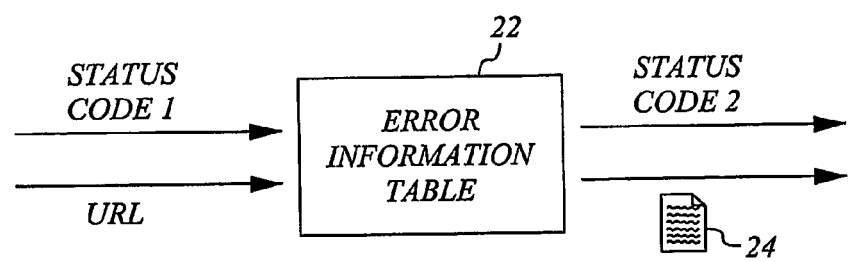
FIG. 6 illustrates error message retrieval according to an examplary embodiment of the present invention.

The error message transformation is preferably implemented by means of an error information table 22. As illustrated in FIG. 6, the first error status code and preferably also the URL of the HTTP request is input to the table 22. Based on this input parameter information, the second status code and the error page with the error description text 24 are provided. It is preferred that the URL is input to the error information table 22, since that enables resource-location dependent error description messages to be output.

The error information table 22 is preferably implemented in the proxy software. However, embodiments where the proxy calls upon an external error information table also lie within the scope of the invention.

Table 1 outlines the structure of an error information table in accordance with a preferred embodiment of the invention. It contains a number of example cases, where input parameters in the form of a first error status code and the server of the URL are transformed into an error description message. The error description message is based on output parameters comprising a second status code and an error page with an error description text. The language of each error page is preferably defined in the table.

TABLE 1

| 1st code | URL | 2nd code | Error page |
|---|---|---|---|
| 400 | www.operator.com | 200 | HTML page with error description text T0 |
| 404 | www.operatorMMSC.com | 200 | new MMS message with error description text |
| 500 | external web server S1 | 200 | WML page with error description text T1 |
| 500 | external web server S2 | 200 | HTML page with error description text T2 |
| 500 | external web server S3 | 200 | WML page with error description text T3 |
| 501 | operator web server | 501 | — |
| 502 | external web server S4 | 200 | HTML page with error description text T4 |

Consider for example a request with a URL that points to a particular web server S1 located outside the mobile operator control. Such a request would, when being subject to an HTTP error with status code 500, according to Table 1 result in that the proxy sends a WML page with a suitable error description text T1 together with the new status code 200 to the client terminal. The status code 200 for "success" guarantees that the error description text is presented to the end-user.

Table 1 implements the mentioned preferred usage of the URL service-location information by the proxy to provide resource-location dependent error messages. One important distinction hereby is between external web servers and servers within the control range of the mobile operator. Sometimes an error code associated with an operator web server may not even be considered to motivate an extended error description text, but rather just pass the proxy unchanged (see the example with status code 501). Furthermore, different external web servers are typically treated differently. The cases with server URL S1, S2 and S3, for example, all have the same input status code (500). Nevertheless, different error description texts T1, T2 and T3 are output, depending on the respective service location. These case specific error description texts evidently contain more detailed explanations of respective error situation than would otherwise be possible.

Figure 7:
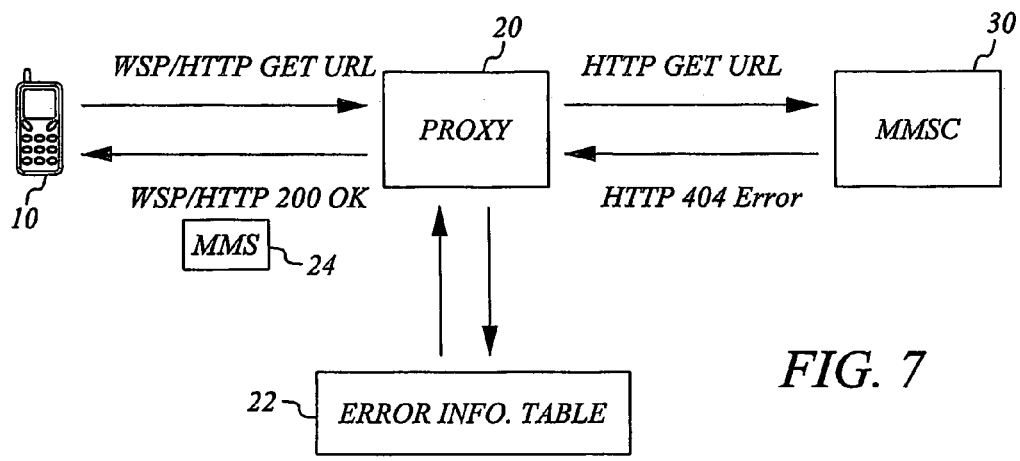
FIG. 7 is a schematic block diagram of an examplary embodiment of an error messaging system for MMS communication according to the present invention.

One example in Table 1 concerns the case where the web server is an MMSC controlled by the mobile operator. This is also illustrated by FIG. 7, which is a schematic block diagram of an examplary error messaging system for MMS communication according to the invention. The error description message now preferably comprises a new MMS message 24 with the desired error description text. In the case of deleted MMS messages (described with reference to FIG. 4), the error description text would typically inform the end-user that the messages have been removed and preferably also include an explanation thereto. The MMS package 24 is sent to the MMS browser of the client terminal 10, where it is converted into a WML or HTML page enabling display of the error description text.

The first status code 404 sent from the MMSC 30 in FIG. 7 is an example. It could be any HTTP error status code, such as e.g. another 4XX code. Similarly, any 2XX code, or other status code associated with compulsory document presentation, may replace the second status code in a preferred MMS communication system.

Figure 8:
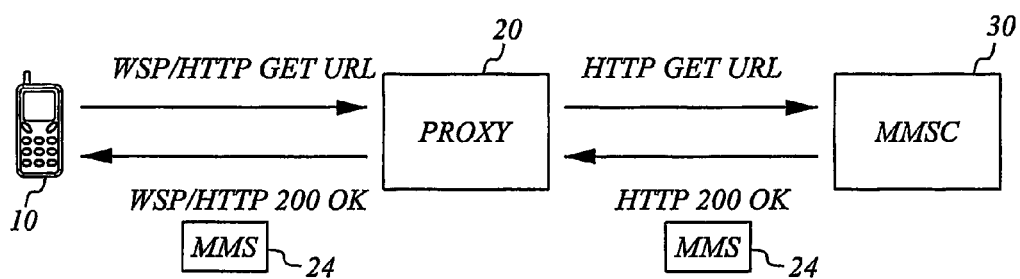
FIG. 8 is a schematic block diagram of another examplary embodiment of an error messaging system for MMS communication according to the present invention.

In FIG. 7 the MMS error message 24 is generated and transmitted from the proxy 20. Although this is the preferred implementation, there may be situations where the new MMS message is instead generated by the MMSC, as illustrated in FIG. 8. The error description text is then, possibly together with one or several images, packed in the MMSC 30 to form the new MMS message 24 according to the MMS standard. The error description text can be implemented through either a text document or an image document in the MMS message 24. The new MMS message 24 with the error description text is sent from the MMSC 30 together with an HTTP status code for success, e.g. the 200 code. Since the proxy 20 now believes that the GET request was successful, it just forwards the error message to the client terminal 10. As before, the MMS package 24 is sent to the MMS browser of the client terminal 10, where it is converted into a WML or HTML page enabling display of the error description text.

Although the illustrated examples concern the request method GET, it should be understood that the invention is applicable to other HTTP request methods as well, including the POST method. A skilled person also realizes that the error code numbers herein are examples and that the invention can be used for other HTTP error codes.

Figure 9:
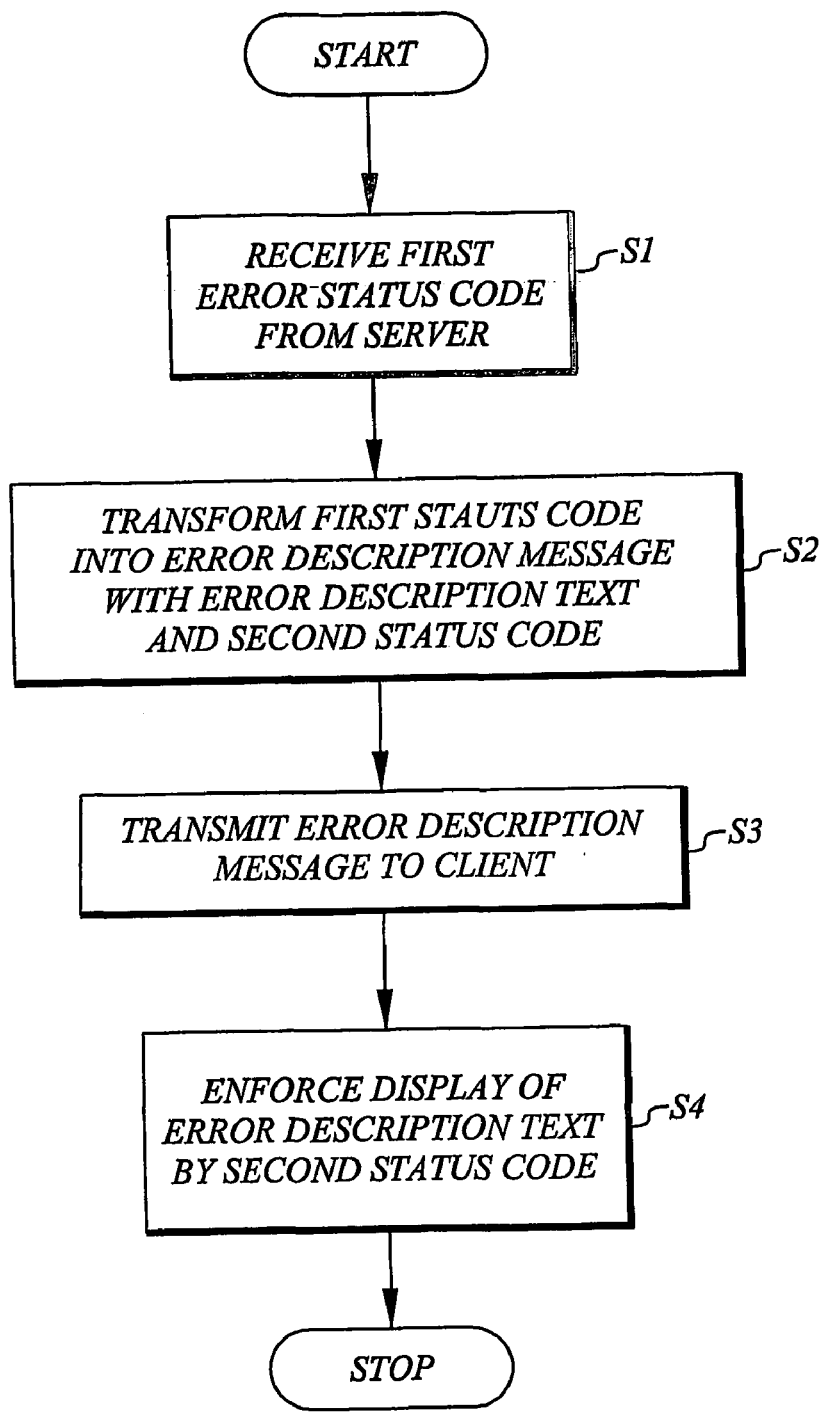
FIG. 9 is a flow chart of an exemplary embodiment of an error messaging method according to the present invention.

FIG. 9 is a flow chart of an examplary embodiment of a preferred method of handling error messages in accordance with the invention. The procedure is initiated upon an HTTP request from a wireless client terminal. In a step S1, a first status code, which is an HTTP error status code from a server, is received at an intermediate device, e.g. a proxy. The first status code is in a step S2 transformed by the intermediate device into an error description message containing an error description text as well as a second status code. Step S2 preferably comprises extracting the error description message from an error information table in response to input parameter information including the first status code and the URL server. Thereby, resource-location dependent error description messages are obtained. In a step S3, the intermediate device transmits the error description message comprising a WML page, an HTML page or an MMS message carrying the error description text to the client terminal. Display of the error description text to the end-user is enforced by the nature of the second status code in a final step S4. The procedure thus achieves guaranteed presentation of any desired error description text.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

The invention claimed is:

1. An error messaging method for a communication system where a wireless client terminal (10) communicates with a server (30) through an intermediate device (20), characterized by the steps of:
   receiving, at the intermediate device (20), a first Hypertext Transfer Protocol (HTTP) status code from the server (30), the first status code being an error status code;
   transforming, at the intermediate device, the first status code into an error description message comprising an error description text (24) and a second HTTP status code, the second status code indicating success and being associated with compulsory display of the error description text (24) at the client terminal (10); and
   transmitting the error description message to the client terminal (10), whereby display of the error description text (24) at the client terminal (10) is enforced by the second status code.

2. The method of claim 1, characterized in that the transforming step in turn comprises extracting the error description message from an error information table (22) in response to input parameter information including the first status code.

3. The method of claim 2, characterized in that the input parameter information further includes a Uniform Resource Locator (URL) portion pointing to the server (30) and in that the extracted error description message is resource-location dependent.

4. The method of any of claim 1, characterized in that the transmitting step is performed by the intermediate device (20).

5. The method of claim 1, characterized in that the intermediate device (20) is selected from the group of an HTTP proxy and a Wireless Application Protocol (WAP) gateway.

6. The method of claim 1, characterized in that the server (30) is a Multimedia Messaging Service (MMS) center.

7. The method of claim 6, characterized in that the error description steps are initiated by a client request for a first MMS message and in that the error description message comprises a second MMS message.

8. The method of claim 1, characterized in that the error description text is displayed at the client terminal (10) by means of a language selected from the group of the Wireless Markup Language (WML) and the Hypertext Markup Language (HTML).

9. A proxy server (20) arranged between a wireless client terminal (10) and a server (30) in a communication system, characterized by error messaging means comprising:
   means for receiving a first HTTP status code from the server (30), the first status code being an error status code;
   means for transforming the first status code into an error description message comprising an error description text (24) and a second HTTP status code, the second status code indicating success and being associated with compulsory display of the error description text (24) at the client terminal (10); and
   means for transmitting the error description message to the client terminal (10), whereby display of the error description text (24) at the client terminal (10) is enforced by the second status code.

10. The proxy of claim 9, characterized in that the means for transforming in turn comprises means for extracting the error description message from an error information table (22) in response to input parameter information including the first status code.

11. The proxy of claim 10, characterized in that the input parameter information further includes a URL portion pointing to the server (30) and in that the extracted error description message is resource-location dependent.

12. The proxy of claim 9, characterized by being selected from the group of an HTTP proxy and a WAP gateway.

13. The proxy of claim 9, characterized by communicating with a MMS center.

14. The proxy of claim 13, characterized in that the error description message comprises a MMS message.

15. The proxy of claim 9, characterized in that the error description text is displayed at the client terminal (10) by means of a language selected from the group of WML and HTML.

16. Error messaging means arranged in a MMS center (30) communicating with a wireless client terminal (10) through a proxy server (20), characterized by:
   means for detecting an error related to an HTTP request from the client terminal (10);
   means for generating an error description message comprising an HTTP status code for success and a MMS message (24) with an error description text based on the detected error, said status code being associated with compulsory display of the error description text at the client terminal (10); and
   means for transmitting the error description message to the client terminal (10) through the proxy (20), whereby display of the error description text (24) at the client terminal (10) is enforced by the HTTP status code for success.

* * * * *